UNITED STATES PATENT OFFICE.

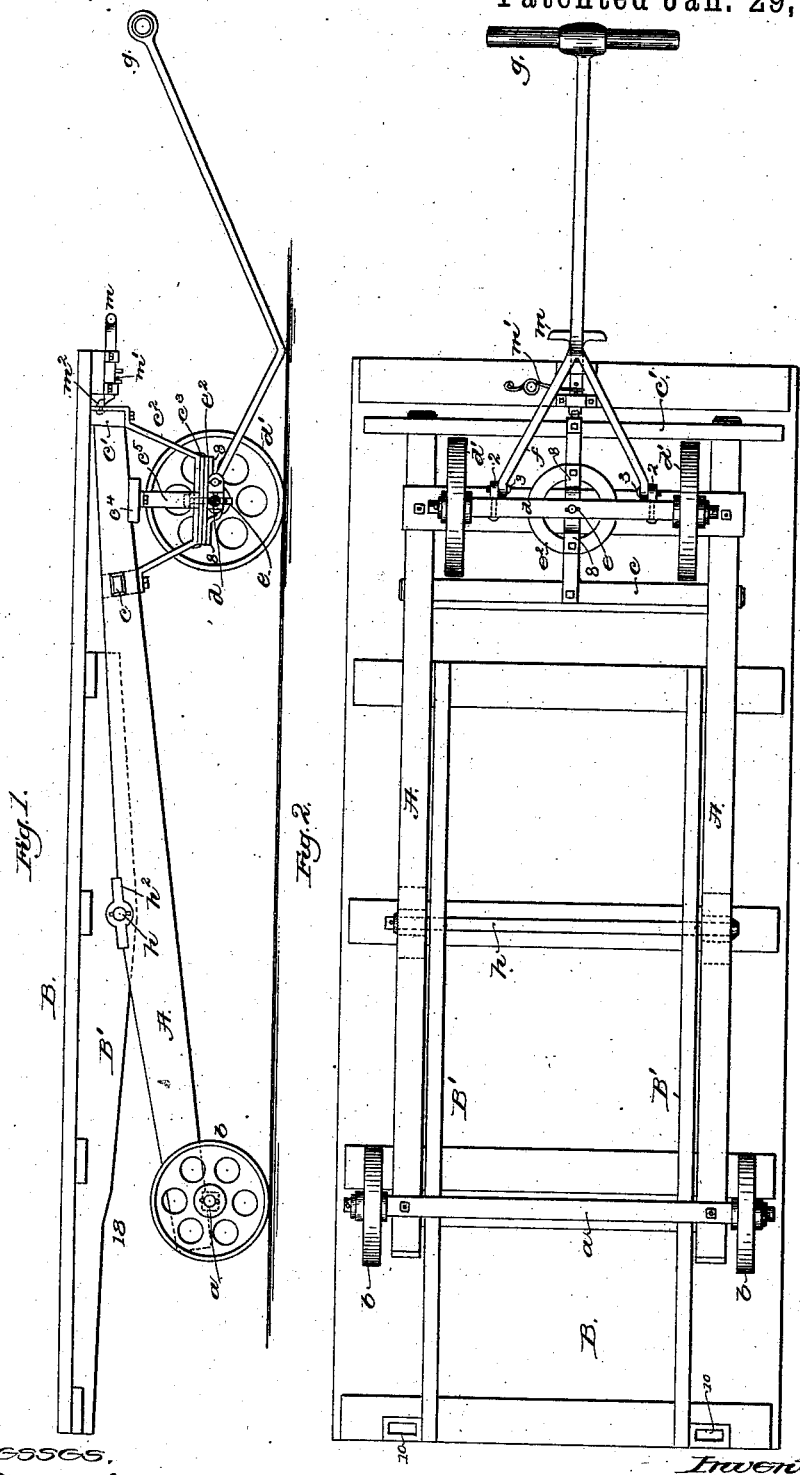

GEORGE H. RAUSCH, OF BOSTON, MASSACHUSETTS.

HAND-TRUCK.

SPECIFICATION forming part of Letters Patent No. 292,680, dated January 29, 1884.

Application filed September 29, 1883. (No model.)

*To all whom it may concern:*

Be it known that I, GEORGE H. RAUSCH, of Boston, county of Suffolk, State of Massachusetts, have invented an Improvement in Trucks, of which the following description, in connection with the accompanying drawings, is a specification, like letters on the drawings representing like parts.

This invention has for its object the production of an improved truck for handling and conveying merchandise in warehouses, manufactories, and stores where heavy goods are to be handled, and is of special importance in the handling of long articles—such as sides of sole-leather, which have to be laid level in order to move the same from place to place in a pile.

The particular features in which my invention consists will be set forth at the end of this specification.

Figure 1 represents in side elevation a truck embodying my invention, one of the front wheels being removed and the axle-arm being in section; and Fig. 2 an under side view thereof.

The main sills A of the truck-frame, suitably joined together at their front ends by cross-beams $c$, $c'$, and $c^4$, are supported at their rear ends upon the axle $a$, which receives the rear wheels, $b$, preferably of smaller diameter than the front wheels.

Below the front end of the frame are two yokes, $c^2$ and $c^5$, which cross each other and have riveted or bolted to them, below their crossing-point, the upper member, $c^3$, of the fifth-wheel, the under member of which is marked $e^2$. The front axle, $d$, provided with the wheels $d'$, receives a king-bolt, $e$, the latter passing through the yokes $c^2$ $c^5$ and part $c^3$ of the fifth-wheel, and also through the part $e^2$ thereof, all substantially as in ordinary wagon construction. The part $e^2$ of the fifth-wheel is bolted to arms 8, which are in turn bolted to the axle. The axle $d$ is provided with suitable eyebolts, 2, which receive bolts 3, that unite the tongue $f$, provided with handle $g$, to the said axle, so as to turn the same according to the direction in which it is desired to move the truck. The platform B has its pivot or fulcrum on a rod, $h$, in suitable bearings, $h^2$, on the sills A, the said pivot being preferably somewhat nearer the rear than the front end of the said platform. The forward end of the platform is provided with a locking device, $m$, composed of a sliding bolt acted upon by a spring, $m'$, and adapted to co-operate with a projection, $m^2$, upon the cross-piece $c'$. Leather or other material to be moved will be piled upon the platform when the latter is in the position Fig. 1, and when drawn to the place where it is desired to discharge it from the platform the locking device will be withdrawn, permitting the platform to be tipped on its pivot $h$, so that by drawing the truck forward the same may be removed from under the load, the latter sliding off the lowered end of the platform. The side pieces, B', composing the platform are cut away, as at 18, Fig. 1, so as to permit the rear end of the platform to descend very close to but not to touch the floor, the side pieces, when the platform is tipped for the discharge of its load, resting upon the axle $a$. Should the rear end of the platform rest upon the floor or ground when a truck was being drawn from under the load, say, of sole-leather, or stone, or lumber, the friction which would have to be overcome by the platform on the floor or ground would be very considerable.

I am aware that it is common to pivot wagon-bodies directly upon the rear axles, and so as to turn about the said rear axles as a center, and I am also aware that the bodies of gravel-cars for railroad purposes have been pivoted near their centers to be tipped to discharge their contents at one side of the car.

The rear end of the platform B, suitably ironed, is provided with skid-blocks 10, having holes to receive the hooks of any usual skid, so that the latter, extended from the platform B to a wagon or car, may be used to slide the material in the wagon or car to the truck to be moved by the latter to the point desired.

I claim—

A hand or warehouse truck consisting of the platform B and the parallel sills A, upon which the said platform is pivoted a little in rear of the middle of the sills, the front wheels, and the rear wheels of smaller diameter than the front wheels, and axles for both front and rear wheels, and on which rear wheels the sills A are directly supported, the front axle supporting the sills by the usual fifth-wheel, all substantially as shown and described.

In testimony whereof I have signed my name to this specification in the presence of two subscribing witnesses.

GEORGE H. RAUSCH.

Witnesses:
G. W. GREGORY,
B. J. NOYES.